May 11, 1943. R. C. GRIFFITH 2,318,851
POWER TRANSMISSION FOR MACHINE TOOLS
Filed Jan. 26, 1938 2 Sheets-Sheet 1
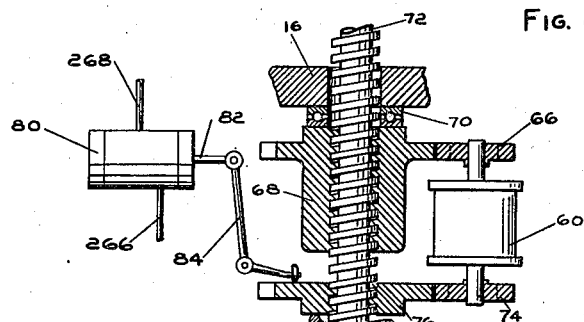
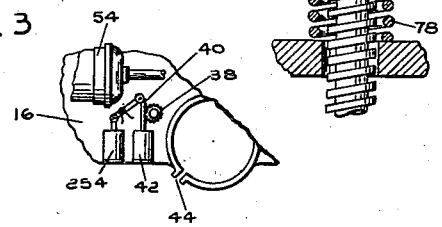
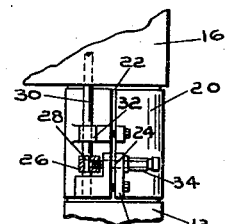
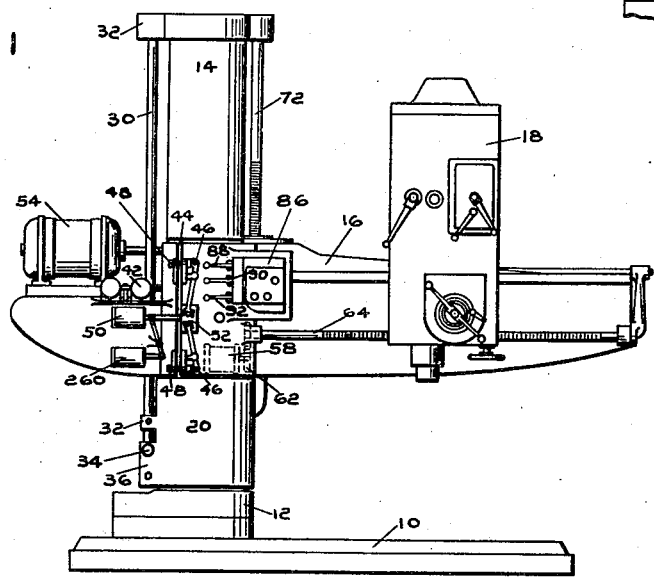
INVENTOR
RAYMOND C. GRIFFITH
BY
ATTORNEY May 11, 1943. R. C. GRIFFITH 2,318,851
POWER TRANSMISSION FOR MACHINE TOOLS
Filed Jan. 26, 1938 2 Sheets-Sheet 2

INVENTOR
RAYMOND C. GRIFFITH
BY
*Ralph L. Tweedale*
ATTORNEY

Patented May 11, 1943

2,318,851

UNITED STATES PATENT OFFICE 2,318,851

POWER TRANSMISSION FOR MACHINE TOOLS

Raymond C. Griffith, Detroit, Mich., assignor to Vickers Incorporated, Detroit, Mich., a corporation of Michigan Application January 26, 1938, Serial No. 186,924

3 Claims. (Cl. 77—28)

This invention relates to power transmissions and more particularly to those of the fluid type wherein a power transmitting fluid, such as oil, and hereinafter referred to as such, is utilized for the transmission of power between one or more pumps and one or more fluid motors.

The invention is particularly concerned with the provision of such a power transmission system which is particularly adapted for use in connection with a radial drill for the purpose of actuating the drill arm up and down on the column and for translating the drill head in and out on the arm as well as for operating clamping mechanisms for the arm and for the swivel mechanism of the column.

It has been proposed heretofore to operate the elevating and traversing mechanisms and the clamps of a radial drill under hydraulic control. One of the difficulties presented is that of providing a safe and yet satisfactory means for elevating and lowering the arm on the column. The arm and mechanism carried thereby on a large radial drill weighs several hundred pounds and it is of prime importance that the possibility of the arm falling from an elevated position due to failure of any portion of the mechanism be avoided entirely. Where the arm is elevated by fluid pressure exerted in a piston and cylinder motor directly connected with the arm, there is ever present the possibility that the fluid pressure may fail due to rupture of a pipe or sticking of a valve and thus permitting the arm to fall suddenly with its attendant hazard to the operator. This possibility has been avoided heretofore in hydraulically controlled radial drills by utilizing a conventional power driven screw and nut elevating mechanism together with suitable hydraulic clutches for controlling the application of power to the elevating mechanism in either direction. Radial drills of this character have been unsatisfactory, however, due to the difficulty of obtaining precise control of the stopping position of the arm in its elevation without unduly sacrificing rapidity of operation when the arm has to be elevated or lowered a considerable distance in one traverse.

It is, accordingly, an object of the present invention to provide a hydraulically operated elevating mechanism for a radial drill which is not only absolutely safe against the possibility of dropping the arm but is also capable of rapidly elevating or lowering the arm as well as precisely controlling the stopping position. This and other objects are achieved by utilizing a screw and nut elevating mechanism together with a rotary fluid motor for actuating the same and suitable valve mechanism for operation of the fluid motor. In addition, means are provided for preventing operation of the fluid motor whenever a predetermined amount of wear has occurred in the screw and nut mechanism of the elevating gear.

A further object is to provide a power transmission system for a radial drill wherein simple and reliable interlocking means are provided for insuring that the arm is clamped whenever the elevating mechanism is stopped and that the arm is unclamped before the elevating mechanism is started.

A further object is to provide a power transmission system wherein a plurality of fluid motors are operated from a single pump under independent control valves and wherein means for by-passing the pump is provided, which means are under the simultaneous control of all of the control valves as well as under the control of certain of the motors.

It is also an object to provide a power transmission for a radial drill having an arm elevating motor, a head traversing motor, a column clamping motor and an arm clamping motor wherein individual control valves are provided for operating any of the motors selectively from a common pump and wherein means is provided for by-passing the pump only when no fluid is required for operation of any of the motors and to prevent by-passing whenever the arm is unclamped.

A further object is to provide a power transmission of the character described wherein the column clamping control valve may be left in clamping or unclamping position and wherein means responsive to operation of the column clamping motor is provided for controlling the by-passing of the pump.

Further objects and advantages of the present invention will be apparent from the following description, reference being had to the accompanying drawings wherein a preferred form of the present invention is clearly shown.

In the drawings:

Fig. 1 is a side elevation of the radial drill incorporating the preferred form of the present invention.

Fig. 2 is a detail sectional view through a portion of the elevating mechanism for the arm.

Fig. 3 is a fragmentary view showing the column clamping motor.

Fig. 4 is a fragmentary view showing the column clamping mechanism.

Figure 5:
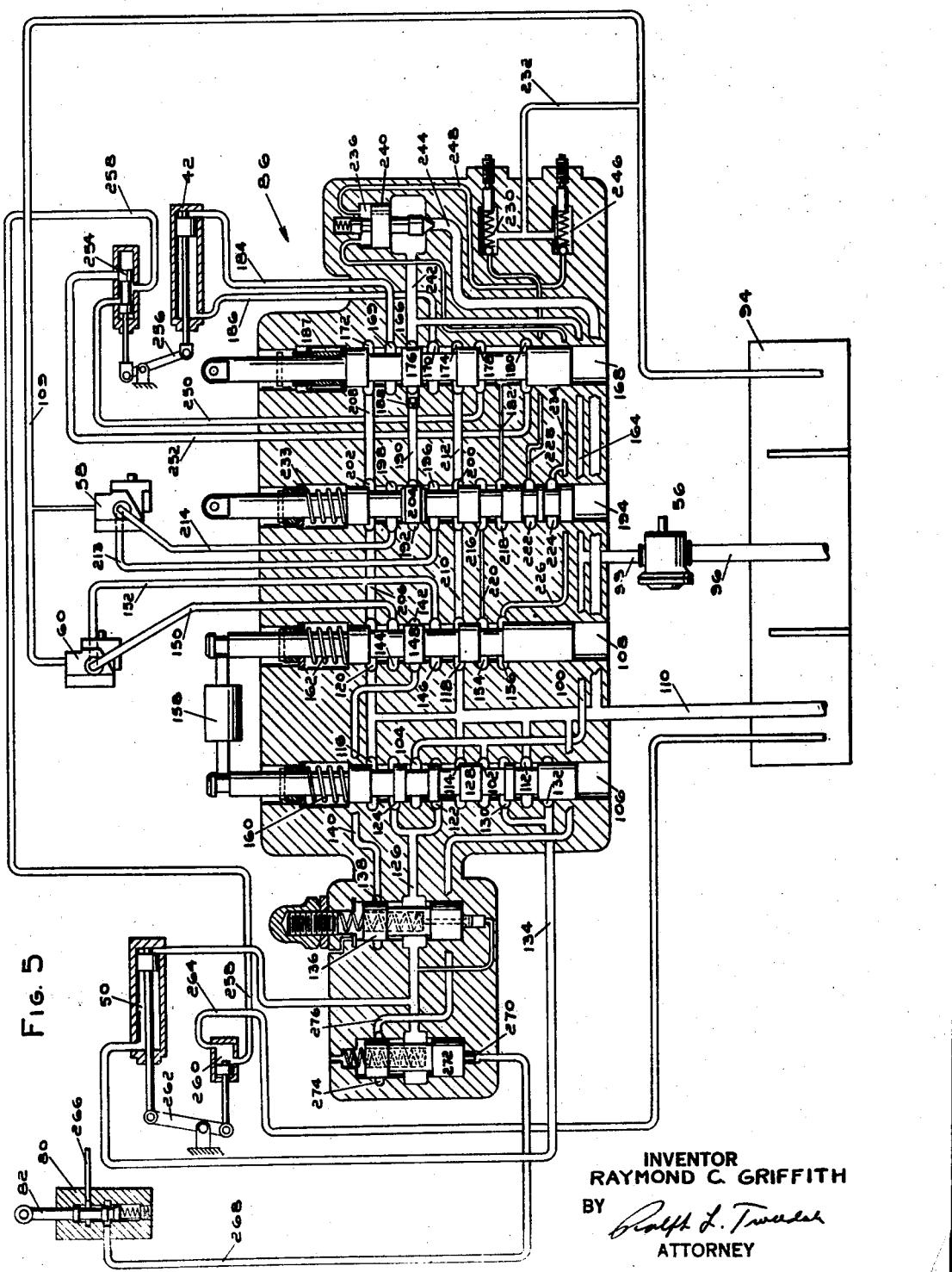
Fig. 5 is a diagrammatical view showing the hydraulic circuits incorporated in the drill press of Fig. 1.

Referring to Fig. 1, there is shown a drill press comprising a base 10 having an upright column 12 secured thereto upon which is rotatably mounted a sleeve 14. Slidably mounted on the sleeve 14 is an arm 16 upon which is mounted a translatable head 18 having the usual motor and spindle together with the necessary controls. Sleeve 14 is provided with an enlarged part 20 at its lower end which is split at 22 (Fig. 4). A clamping bolt 24 carries a block 26 at one end which is engaged and an eccentric crank 28 formed on a clamping shaft 30, pivoted in bearings 32 at the top and bottom of the sleeve 14. The other end of the bolt 24 carries an adjustable nut 34, for engagement with a flange 36 adjacent the slot 22.

The shaft 30 is provided with a longitudinal keyway and carries slidably but non-rotatably secured thereto a pinion 38 (Fig. 3) which engages with a rack 40 formed on the stem of a piston and cylinder fluid motor 42. It will be seen that actuation of the motor 42 will rotate the pinion 38 through the rack 40 and as a consequence rotates the shaft 30, which, acting through the crank 28 and block 26 will cause the nut 34 to clamp the adjacent sides of slot 22 closely together to prevent the sleeve 14 from rotating on the column 12.

The arm 16 is provided with a slot 44 in a manner analogous to the large portion 20 of the sleeve 14. Suitable clamping levers 46 act through clamping bolts 48 to close the slot and clamp the arm to the sleeve whenever the adjacent levers 46 are moved to the left in Fig. 1. A piston and cylinder fluid motor 50 has a stem 52 engageable with the ends of the levers 46 for this purpose, the arrangement being such that a toggle action is provided whereby the arms 46 when once moved thereto remain in clamped position, without maintaining fluid pressure in the motor 50.

Mounted on the arm is an electric motor 54 for operating a pump 56 (Fig. 5) for supplying fluid to the motors 42 and 50 as well as to a rotary fluid motor 58 and a second rotary fluid motor 60. The motor 58 is connected by gearing 62 (Fig. 1) to a head traversing screw 64 mounted in suitable bearings on the arm 16 and operating in a suitable nut secured to the head 18. The motor 60 is connected by gearing 66 to an elevating nut 68 (Fig. 2) mounted in the arm 16 and supporting the same on anti-friction thrust bearings 70. The nut 68 is threaded on a stationary elevating screw 72 secured to a sleeve 14.

The motor 60 is also connected by gears 74 to an auxiliary nut 76 threaded on the screw 72 and urged upwardly relative to the nut 68 by a spring 78 abutting against the bottom wall of the arm 16. It will be seen that the weight of the arm 16 holds the nut 68 with the bottom surface of its threads always in contact with the upper surface of the threads on the screw 72. The nut 76, however, is urged by the spring 78 upwardly so that the upper surface of its threads are always in contact with the bottom surface of the threads on the screw 72. Consequently, as wear occurs in the threads of both the screw 72 and the nut 68 or of either of them, the nut 76 will move upwardly relative to the nut 68 and arm 16. The nut 76 is thus responsive to wear occurring in the threads of the elevating mechanism.

A two-way pilot valve 80 is mounted on the arm and has a stem 82 connected to the lever 84, the right hand end of which is urged lightly into contact with the top surface of the nut 76 by a spring within the valve 80. The valve 80 is so adjusted that whenever wear has occurred in the threads of the elevating mechanism sufficient to render them liable to strip, the valve will open communication between its two ports.

Control of the fluid motors 42 and 50, 58 and 60 is exercised through a unitary control panel 86 mounted on the front of the arm and having 3 operating handles 88, 90 and 92. Referring now to Fig. 5, the hydraulic circuits connecting the pump 56, the panel 86 and the respective fluid motors are there illustrated. A tank 94, which may be provided in a hollow portion of the arm 16, contains a supply of oil which may be withdrawn through a suction conduit 96 by the pump 56. The latter delivers oil to the panel through a conduit 98 having a branch 100 extending to ports 102 and 104 of a valve 106. The latter is for the purpose of controlling the admission of fluid to the column clamping motor 50 and in connection with a second valve 108, to the elevating motor 60. A drain conduit 109 connects the casings of motors 58 and 60 with the tank 94. A tank conduit 110 connects with ports 112, 114 and 116 of the valve 106 and also with ports 118 and 120 of the valve 108. Ports 122 and 124 of the valve 106 connect a conduit 126 with the tank ports 114 and 116 whenever a valve spool 128 is in the center position as illustrated. When the spool 128 is moved downwardly port 122 connects to pressure port 104 while port 124 is cut off from tank port 116. When the spool 128 is moved upwardly port 124 connects to pressure port 104 while port 122 is cut off from tank port 114.

Ports 130 and 132 connect a conduit 134 with the pressure port 102 when the valve spool 128 is in the center position. When the spool is moved upwardly port 130 is cut off from port 102 and connected to tank port 112. When the spool is moved downwardly port 132 is connected to tank port 112 while port 130 is cut off from pressure port 112. Conduit 134 connects with the rod end of the arm clamping motor 50 while conduit 126 connects with the head end thereof.

Interposed in the conduit 126 is a pressure responsive by-pass valve 136 which closes communication between conduit 126 and a port 138 whenever pressure in the conduit 126 is below a predetermined value, which is above the pressure required normally to move the motor 50 into unclamping position. At any pressure above this valve 136 opens permitting oil to flow into port 138 and through a conduit 140 to the pressure port 142 of the valve 108.

The latter has a pair of ports 144 and 146 which are connected to the tank ports 118 and 120 when a valve spool 148 is in the center position as shown. When the spool is moved upwardly port 144 remains connected to port 120 while port 146 is cut off from port 118 and connected to pressure port 142. When the spool is moved downwardly opposite connections are made. The ports 144 and 146 connect by conduits 150 and 152 with the opposite sides of the fluid motor 60. The valve 108 also has a pair of ports 154 and 156 which are connected together when the spool 148 is in center position, but which are cut off from each other when the spool is moved upwardly or downwardly.

The spools 128 and 148 are connected together as shown at 158 for simultaneous operation by the control lever 90. Suitable centering springs 160 and 162 return the spools to center position whenever the handle 90 is released.

The pressure conduit 98 has a branch 164 connecting to a port 166 of a valve 168 which controls operation of the column clamping motor 42. The valve is provided with a pair of ports 169 and 170 which are normally connected to tank ports 172 and 174 when the spool 176 is in center position. When the spool is moved upwardly, port 169 remains connected to tank ports 172 while port 170 is cut off from return port 174 and connected to pressure port 166. When the spool is moved downwardly the opposite connections are made. The valve 168 is also provided with a pair of ports 178 and 180 which are normally connected together in the center position and cut off from each other when the spool is moved either upwardly or downwardly.

A conduit 182 remains connected with both ports 178 and 180 in the center position, with the port 178 only when the valve is moved upwardly and with the port 180 only when the valve is moved downwardly. Conduits 184 and 186 connect the ports 169 and 170 with the opposite ends of the column clamping motor 42. The valve spool 176 is operated by the lever 92, suitable stopping mechanism 187 being provided for limiting movement thereof. No centering spring is provided for the spool 176.

The port 166 connects through a fixed restriction 188 and a conduit 190 with a port 192 of a valve 194 for controlling operation of the head traversing motor 58. Valve 194 is provided with a pair of ports 196 and 198 which are normally connected with tank ports 200 and 202 when the valve spool 204 is in center position. Conduits 206 and 208, 210 and 212 connect the tank ports 120, 202 and 172 and the tank ports 118, 200 and 174. When the valve spool 204 is moved upwardly, port 198 remains connected with tank port 202 while port 196 is cut off from tank port 200 and connected with pressure port 192. When the spool is moved downwardly, opposite connections are made. Conduits 213 and 214 connect the ports 196 and 198 with the opposite sides of the head traversing motor 58.

The valve 194 is provided with a pair of ports 216 and 218 which are connected together in center position of the spool and cut off from each other when the spool is moved upwardly or downwardly. Port 218 connects with conduit 182 while port 216 connects with port 154 by a conduit 220. The valve 194 is also provided with a pair of ports 222 and 224 which are normally cut off from each other in center position of the spool and which are adapted to be connected together when the spool is moved upwardly or downwardly. Port 224 connects by a conduit 226 with port 156, port 222 connects by a conduit 228 with a low pressure pilot relief valve 230 adapted to dump oil to the tank 94 through a conduit 232 whenever a predetermined low pressure is exceeded in the conduit 228. Spool 204 is adapted to be operated by lever 88 and is provided with a centering spring 233.

The conduit 226 has a branch 234 leading to the control chamber 236 of a pilot operated relief valve 240. The latter is connected by a branch conduit 242 with the pump delivery conduit branch 164, and is adapted to dump oil to the tank 94 through a relief conduit 244. The valve 240 is constructed and operates similarly to the relief valve shown in the patent to Harry F. Vickers, 2,043,453. A high pressure pilot relief valve 246 connects by a conduit 248 with the control chamber 236 to limit the pressure therein when the low pressure pilot valve 230 is cut off at the ports 222 and 224.

The ports 178 and 180 of the valve 168 connect by conduits 250 and 252 with a three-way pilot valve 254 which is operated by the column clamping motor 42 through a lever 256. The arrangement is such that a conduit 258 is connected with conduit 250 when the motor 42 is in clamped position as illustrated, while the conduit 258 is connected to conduit 252 when the motor 42 is in unclamped position. The conduit 258 extends to a two-way pilot valve 260 which is operated by the arm clamping motor 50 through a lever 262. The valve 260 opens communication between conduit 258 and a conduit 264 whenever the motor 50 is in clamped position, as illustrated, and closes communication therebetween at all other times. The conduit 264 connects to the tank 94.

The pilot valve 80 which is shown in Fig. 2 is connected with an external source of pressure such as the customary air or water line by a conduit 266 and normally closes communication of that conduit with a conduit 268 leading to the operating cylinder 270 of a by-passing valve 272. The latter in its closed position cuts off communication of a port 274 with the conduit 126. Port 274 is connected to tank 94 through a conduit 276 leading to the tank conduit 110. Whenever valve 80 opens due to excessive wear in the elevating screw mechanism the auxiliary pressure enters through the pipe 266, valve 80, conduit 268 to lift the valve 272 and connect the conduit 126 with the tank through port 274 and conduit 276, thus preventing the pressure from being applied to the head end of the arm clamping motor 50, and from being delivered to the arm elevating motor 60 through the by-passing valve 136.

In operation, with the parts in the rest position with the valves 106, 108, 194 and 168 centered, the oil delivered from pump 56 is by-passed through conduit 98, 164 and 242, relief valve 240 and conduits 244 and 110 to the tank 94. The relief valve 240 is held open under these conditions by the fact that the control chamber 236 is vented through a control circuit comprising conduits 234 and 226, ports 156 and 154, conduit 220, ports 216 and 218, conduit 182, port 178, conduit 250, valve 254, conduit 258, valve 260 and conduit 264 to the tank 94. It will be noted that this control circuit may be blocked by movement of any one of the valves 108, 194, and 168 out of center position. The circuit is also blocked by the valve 260 whenever the motor 50 is in unclamped position, the reverse of that shown in Figure 5. When the circuit is blocked by the valve 168 the same may be opened again when the motor 42 completes its movement due to the two-way circuit from the conduit 182 to the conduit 258.

If it is desired to elevate the arm 16 on the column sleeve 14 the lever 90 may be pulled forward, lifting the spools 128 and 148 simultaneously. Under these conditions pressure fluid flows from the pump through conduits 98 and 100, ports 104 and 124 and conduit 126 to the right hand end of the motor 50. The relief valve control circuit is blocked at the port 156 permitting valve 240 to close. The motor piston accordingly moves to the left in Fig. 5 or to the right in Fig. 1, releasing the arm clamps 46. The normal resistance to this movement does not create sufficient pressure in the conduit 126 to open the by-pass valve 136.

As soon as the movement is completed, however, the piston stalls and pressure rises in the conduit 126 opening the by-passing valve 136 to permit oil to flow through port 138, conduit 140, ports 142 and 146 and conduit 152 to the motor 60. The latter is thus caused to rotate driving the nuts 68 and 76 in the direction to elevate the arm. The return circuit for fluid discharged from the left end of the motor 50 is through the conduit 134, ports 130 and 112 and conduit 110 to the tank. Fluid returning from the motor 60 passes through conduit 150, ports 144 and 120, and conduit 110 to the tank. When the arm has been elevated to the point desired the lever 90 is released permitting the valves 106 and 108 to center. At this time port 130 is opened to pressure port 102 of the valve 106 permitting pressure fluid to flow into the conduit 134 and to the left end of motor 50 returning the same to clamping position.

It will be noted that until the motor 50 reaches clamped position and the arm is clamped to the column the relief valve control circuit is not by-passed. If it is desired to lower the arm, lever 90 is pushed backwardly moving the spools 128 and 148 downwardly. Under these conditions pressure fluid is delivered from port 104 to port 122 and conduit 126 to unclamp the arm in the same manner as before. When the arm is fully unclamped, the by-pass valve 136 again opens permitting pressure oil to flow through conduit 140, ports 142 and 144, and conduit 150 to the opposite side of the motor 60, causing the nuts 68 and 76 to rotate in the reverse direction. Fluid returns from the motor 60 through conduit 152, ports 146 and 118 and conduit 110 to the tank.

If it is desired to traverse the head 18 outwardly on the arm 16 the lever 88 is pulled forward, raising the valve spool 204 and permitting pressure fluid to flow through conduits 98 and 164, port 166, restriction 188, conduit 190, ports 192 and 196 and conduit 213 to the motor 58. Fluid returning from the motor 58 passes through conduit 214, ports 198, and 202, conduit 206, port 120 and conduit 110 to the tank. At the same time the relief valve control circuit is cut off at the port 218 and since ports 222 and 224 are open to one another the control chamber 236 on the relief valve is connected through conduits 234 and 228 to the low pressure relief valve 230.

It will be seen, accordingly, that when the motor 58 is operated the maximum pressure is limited to a lower value than that utilized for operation of the motors 50 and 60. Likewise, the rate at which fluid is supplied to the motor 58 is reduced by the restriction 188. It is thus possible to utilize a single pump 56 for the relatively light duty of traversing the head 18, as well as for the heavy duty of elevating the arm 16.

When it is desired to traverse the head inwardly the lever 88 is moved back, moving the valve spool 204 downwardly, permitting the pressure oil to flow from the port 192 to the port 198 and conduit 214 to the opposite side of the motor 58. Returning fluid passes through the conduit 213, ports 196 and 200, conduit 210, port 118 and conduit 110 to the tank. The relief valve control circuit is again blocked at port 216 and ports 222 and 224 are connected together as before.

If it is desired to unclamp the column sleeve 14, the lever 92 is pushed backwardly, moving the valve spool 176 downwardly to admit pressure fluid from the conduit 164 through ports 166 and 169 and conduit 184 to the right hand end of motor 42. Fluid returning from the left end passes through the conduit 186, ports 170 and 174, conduit 212, port 200, conduit 210, port 118 and conduit 110 to the tank. The valve spool 176 not being spring centered, the control handle 92 may be left in its pushed-back position indicating that the column is unclamped. The relief valve control circuit is vented, however, as soon as the motor 42 completes its movement, the circuit being from the conduit 182 through port 180, conduit 252 and valve 254 to the conduit 258.

The column may be clamped by pulling the lever 92 forwardly, lifting the valve spool 176 and admitting pressure fluid from port 166 to port 170, conduit 186 to the left end of motor 42. Returning fluid passes through conduit 184, ports 169 and 172, conduit 208, port 202, conduit 206, port 120 and conduit 110 to the tank. The lever 92 may be left likewise in its forward position indicating that the column is clamped while the relief valve is again vented through port 178 and conduit 250 as soon as the motor 42 reaches clamped position.

Should excessive wear occur on the threads of screw 72 or nut 68, the valve 80 opens, admitting pressure fluid to the piston 270 and opening the by-pass valve 272. With this valve open it is impossible to create pressure in the conduit 126 and accordingly, the clamping motor 50 cannot be unclamped nor can the elevating motor 60 be operated since the by-pass 136 cannot open.

It will be understood, of course, that the speed of operation of the motors 58 and 60 as well as motors 42 and 50 may be regulated by opening their respective control valves to a greater or lesser degree.

While the form of embodiment of the invention as herein disclosed, constitutes a preferred form, it is to be understood that other forms might be adopted, all coming within the scope of the claims which follow.

What is claimed is as follows:

1. In a radial drill the combination with a rotatable column, an arm vertically slidable on the column and a head translatable on the arm of a fluid motor for clamping the column, a fluid motor for clamping the arm, means for elevating and lowering the arm, a fluid motor for causing operation of said means, means for traversing the head on the arm, a fluid motor for causing operation of the last said means, pump means forming a common source of pressure fluid for operating said motors, valve means for controlling operation of said motors and means for limiting the pressure effective on the traversing motor to a lower value than the normal pressure on the elevating motor.

2. In a radial drill the combination with a rotatable column, an arm vertically slidable on the column and a head translatable on the arm, of a fluid motor for clamping the column, a fluid motor for clamping the arm, means for elevating and lowering the arm, a fluid motor for causing operation of said means, means for traversing the head on the arm, a fluid motor for causing operation of the last said means, pump means forming a common source of pressure fluid for operating said motors, valve means for controlling operation of said motors and means for limiting the rate at which fluid is supplied to the traversing motor to a smaller rate than that to the elevating motor.

3. In a radial drill the combination with a rotatable column, an arm vertically slidable on the column and a head translatable on the arm, of a fluid motor for clamping the column, a fluid motor for clamping the arm, means for elevating and lowering the arm, a fluid motor for causing operation of said means, means for traversing the head on the arm, a fluid motor for causing operation of the last said means, pump means forming a common source of pressure fluid for operating said motors, valve means for controlling operation of said motors and means for limiting the pressure effective on, and the rate at which fluid is supplied to, the traversing motor to values lower than the normal values for the elevating motor.

RAYMOND C. GRIFFITH.